US012658626B2

(12) United States Patent
Sapozhnikov et al.

(10) Patent No.: US 12,658,626 B2
(45) Date of Patent: Jun. 16, 2026

(54) HIGH SPEED AND HIGH DENSITY CABLE INTERCONNECTS

(71) Applicant: Cisco Technology, Inc., San Jose, CA (US)

(72) Inventors: Mike Sapozhnikov, San Jose, CA (US); Sayed Ashraf Mamun, San Jose, CA (US); D. Brice Achkir, Livermore, CA (US); David Nozadze, San Jose, CA (US); Amendra Koul, San Francisco, CA (US); Upendranadh R. Kareti, Union City, CA (US)

(73) Assignee: Cisco Technology, Inc., San Jose, CA (US)

( * ) Notice: Subject to any disclaimer, the term of this patent is extended or adjusted under 35 U.S.C. 154(b) by 437 days.

(21) Appl. No.: 18/300,956

(22) Filed: Apr. 14, 2023

(65) Prior Publication Data

US 2023/0378677 A1 Nov. 23, 2023

Related U.S. Application Data

(60) Provisional application No. 63/365,108, filed on May 20, 2022.

(51) Int. Cl.

| | |
|---|---|
| ***H01R 13/6584*** | (2011.01) |
| ***H01B 11/18*** | (2006.01) |
| ***H01R 13/24*** | (2006.01) |
| ***H01R 13/66*** | (2006.01) |
| ***H01R 43/00*** | (2006.01) |

(52) U.S. Cl.

CPC ......... *H01R 13/2414* (2013.01); *H01B 11/18* (2013.01); *H01R 13/6584* (2013.01); *H01R 13/6625* (2013.01); *H01R 43/007* (2013.01)

(58) Field of Classification Search

None

See application file for complete search history.

(56) References Cited

U.S. PATENT DOCUMENTS

| | | | | |
|---|---|---|---|---|
| 5,618,205 A * | 4/1997 | Riddle | H01P 5/085 | 333/260 |
| 5,624,277 A * | 4/1997 | Ward | H01R 13/7195 | 439/620.09 |
| 6,380,485 B1 * | 4/2002 | Beaman | H01R 13/6589 | 439/497 |
| 6,843,657 B2 * | 1/2005 | Driscoll | H05K 7/1454 | 439/579 |

(Continued)

FOREIGN PATENT DOCUMENTS

WO 2021144726 A1 7/2021

*Primary Examiner* — Felix O Figueroa

(74) *Attorney, Agent, or Firm* — Patterson + Sheridan, LLP

(57) ABSTRACT

A communication interconnect system is described. The system may include a co-packaged cables (CPC) tile with a slot formed from a first surface to slot surface at a first depth in the CPC tile and a plurality of channels formed between the slot surface and a second surface opposite the first surface. The system may also include a twinaxial cable with a pair of conductors positioned in the slot such that the pair of conductors are inserted in a pair of channels of the plurality of channels to establish an electrical connection between the twinaxial cable and the pair of channels. The system also includes a plurality of elastomer pins positioned in the plurality of channels adjacent to the second surface.

13 Claims, 21 Drawing Sheets

(56) References Cited

U.S. PATENT DOCUMENTS

| | | | | |
|---|---|---|---|---|
| 6,910,897 | B2 * | 6/2005 | Driscoll | H01R 12/7011 174/541 |
| 11,387,607 | B2 * | 7/2022 | Guo | H01R 12/75 |
| 11,894,629 | B2 * | 2/2024 | Consoli | H05K 1/095 |
| 2011/0296678 | A1 | 12/2011 | Russell | |
| 2016/0073559 | A1 | 3/2016 | Nordin et al. | |
| 2021/0391673 | A1 | 12/2021 | Girard, Jr. et al. | |
| 2022/0224034 | A1 | 7/2022 | Do et al. | |

* cited by examiner

HIGH SPEED AND HIGH DENSITY CABLE INTERCONNECTS

CROSS-REFERENCE TO RELATED APPLICATIONS

This application claims benefit of U.S. provisional patent application Ser. No. 63/365,108 filed May 20, 2022. The aforementioned related patent application is herein incorporated by reference in its entirety.

TECHNICAL FIELD

Embodiments presented in this disclosure generally relate to coupling optical or other types of cable connections to electronic circuits. More specifically, embodiments disclosed herein relate to a connection interface for co-packaged cables (CPC) and near package cables (NPC) that provides a direct connection between CPC/NPC and a printed circuit board (PCB).

BACKGROUND

Current application-specific integrated circuit (ASIC) Serializer/Deserializer (SerDes) interface speeds are approximately 112 gigabit per second (Gb/s) with development of the speeds advancing towards 224 Gb/s. These increased speed requirements pose many challenges to current system architectures and implementations. Previous solutions utilize PCB routing and ASIC escape which add loss to the channel. For example, high-speed channel loss budgets from the ASIC input/output (IO) to a pluggable module interface or to a Fabric IO are challenging to achieve using PCB channels. The use of lossy materials or routing techniques result in higher costs with no guarantee to achieve the anticipated performance.

High-speed copper cable can reduce the loss budgets in connections, but there are size and placement issues with connectors near the ASICs. For example, copper cables have a low density interconnect that may be place near an ASIC. Moreover, the loss and cost of the terminations are high and there are no clear paths to CPC with ASIC that is compatible with some of the CPO (co-packaged optics) concepts which are in development and deployed in networks.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1A:
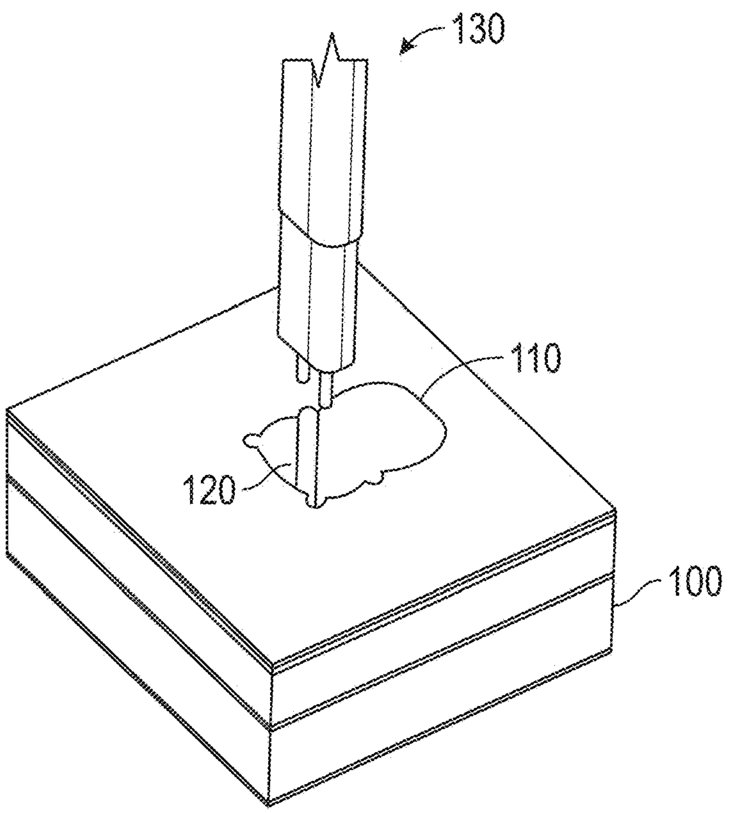
FIGS. 1A-1B illustrate a CPC tile with a slot, according to embodiments described herein.

One general aspect includes a co-packaged cables (CPC) tile may include: a slot formed from a first surface to slot surface at a first depth in the CPC tile, a plurality of channels formed between the slot surface and a second surface opposite the first surface, a twinaxial cable may include a pair of conductors and positioned in the slot such that the pair of conductors are inserted in a pair of channels of the plurality of channels to establish an electrical connection between the twinaxial cable and the pair of channels. The system also includes a plurality of elastomer pins positioned in the plurality of channels adjacent to the second surface.

One general aspect includes a method. The method includes providing a co-packaged cables (CPC) tile may include a ground plane; forming a slot in a first surface of the CPC tile to a first depth at the ground plane using a vertical slot drilling method, drilling a plurality of channels between a surface of the slot at the first depth and a second surface of the CPC tile opposite the first surface, forming conductive channels in the slot and plurality of channels, positioning a twinaxial cable in the slot such that a pair of conductors are inserted in a pair of channels of the plurality of channels to establish an electrical connection between the twinaxial cable and the pair of channels, forming a set of uncompressed elastomer pins in the plurality of channels, and compressing the set of elastomer pins.

One general aspect includes a co-packaged cables (CPC) tile. The CPC tile may include: an array of slots formed from a first surface a first depth in the CPC tile, an array of a plurality of channels formed between a slot surface in each respective slot of the array of slots and a second surface opposite the first surface, a plurality of twinaxial cable each may include a pair of conductors and positioned in respective slot of the array of slots such that the pair of conductors are inserted in a pair of channels of the plurality of channels to establish an electrical connection between the twinaxial cable and the pair of channels. The system also includes a plurality of elastomer pins positioned in the plurality of channels adjacent to the second surface.

EXAMPLE EMBODIMENTS

CPO is an approach to shorten a signal channel between a PCB/ASIC and an associated external communication channel such as a cable connection. As the networks develop, the optical tile connection should provide cable solutions to provide an end user with flexibility to connect optical or copper paths for better power and performance optimizations. The various embodiments herein provide a communication interconnect system in a CPC tile which allows for direct connection of optical cables to PCB/ASICs. The embodiments described herein provide superior electrical performance including improved return loss (RL), insertion loss (IL), and crosstalk (Xtalk). The embodiments also allow for a higher density of connections, closer to the circuits, than previous connection schemes. The embodiments described herein also provide compatibility with existing CPO/near package optics (NPO) components/tiles such that the embodiments may be easily implemented in deployed equipment and fabrics. For example, copper cables have a low density interconnect that may be place near an ASIC. Moreover, the loss and cost of the terminations are high and there are no clear communication paths from the CPC to the ASIC that is compatible with some of the CPO (co-packaged optics) concepts which are in development and deployed in networks.

The embodiments described herein also provide a design which enables manufacturability by either connector or cable suppliers, which expands a base of suppliers and vendors (e.g., PCB suppliers) that may manufacture the components. The various embodiments also provide cost effective and flexible scalability across the broad range of products from high powered ASICs to high-volume platforms. The various embodiments also provide a reworkable solution to enable better manufacturing yield and reduce the amount of mechanical force required to terminate the cable tiles to PCB or PKG as described in further detail herein.

Figure 1B:
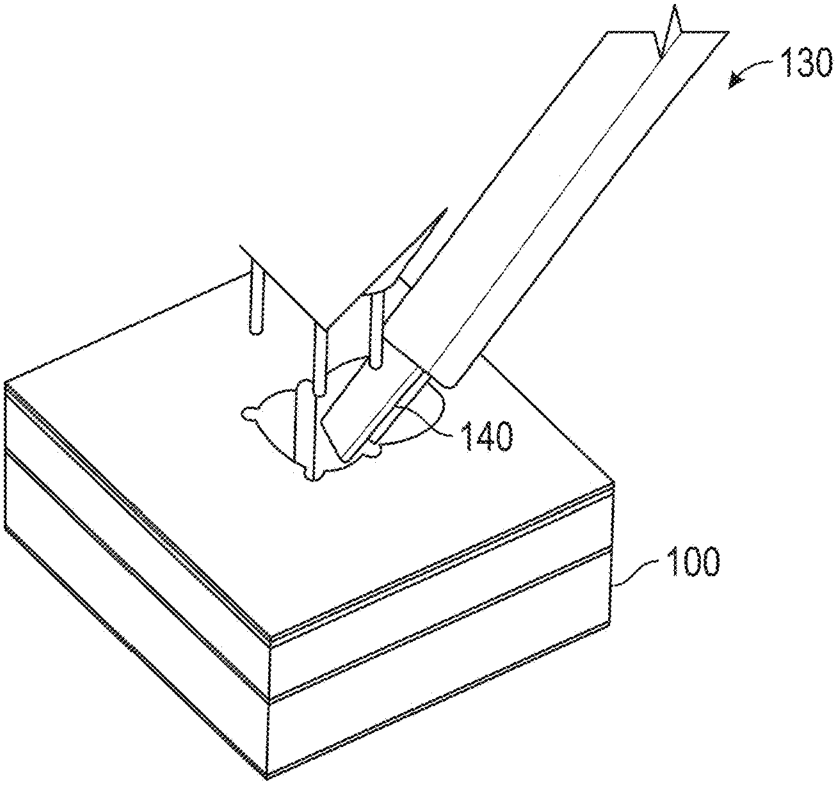

FIGS. 1A-1B illustrate a CPC tile with a slot, according to embodiments described herein. While referred to as a CPC tile, the various tile embodiments may include NPC or other types of connections which use PCB platforms and technology. For example, a tile 100 shown in FIG. 1A has a slot 110. In the example shown in FIG. 1A, a cable 130 may be inserted or removably attached to a first portion 120 of the slot 110 where the cable 130 is vertical relative to the tile 100. In some examples, the tile 100 avows for a direct termination of twinaxial (twinax) cabling (cable 130) into the slot 110.

Figure 3A:
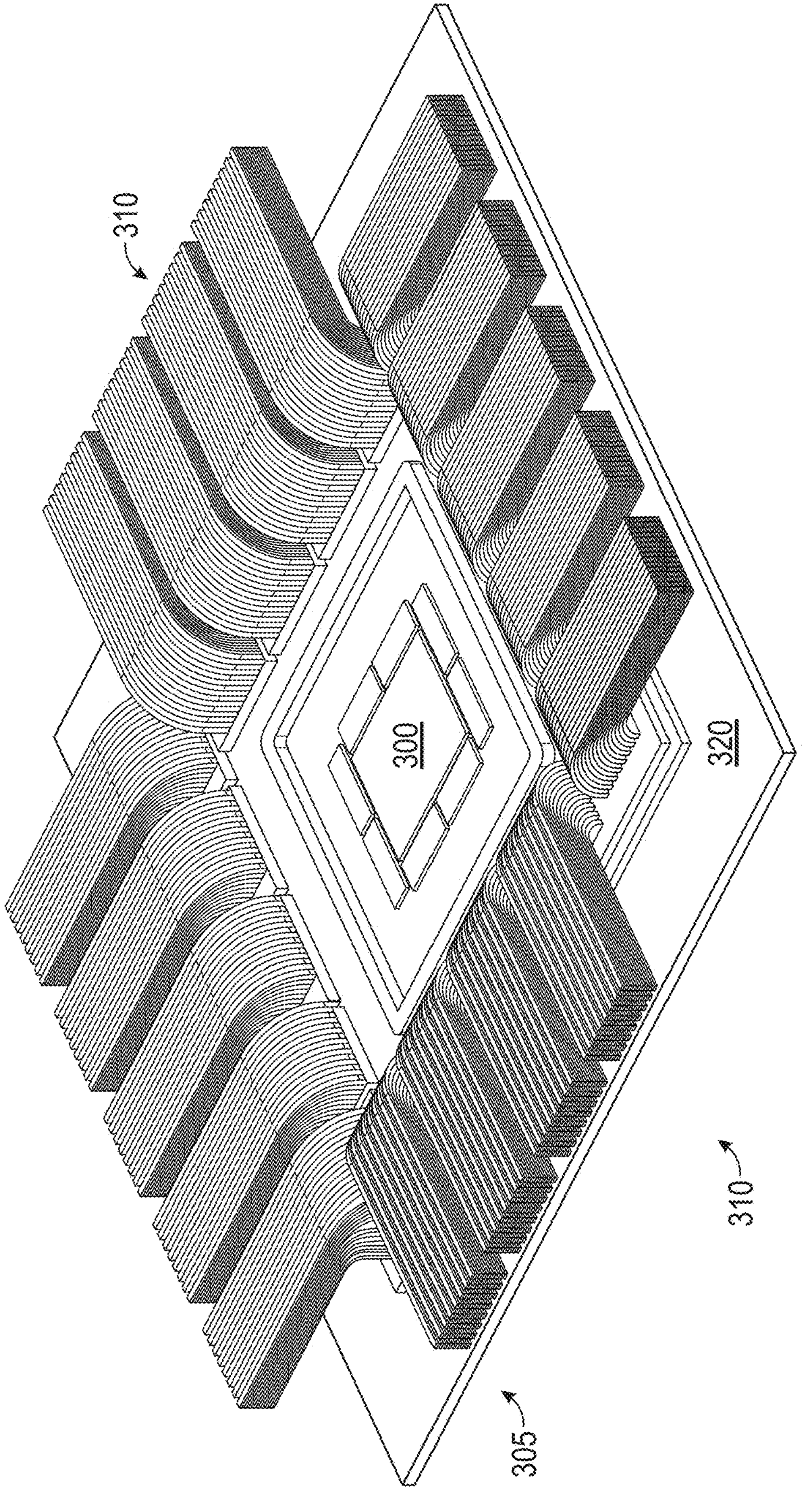
FIG. 3A-3C illustrate an ASIC with a plurality of CPCs, to embodiments described herein.

In FIG. 1B, the cable 130 is inserted into a portion 140 of the slot 110 where the cable 130 is inserted at an angle less than vertical or 90 degrees along an angled/sloped slot surface to provide a low profile cable connection to the tile 100. In some examples, the slot 110 is a v-shaped or V-type slot with a slope surface in the slot which enables low profile cable management from the CPC/NPC tile, tile 100. In some examples, the V shaped slots reduce a bend radius in the cable 130 and enable high density interconnect solutions, where multiple tiles 100 and cables 130 may be packaged and attached to an ASIC/PCB in a high density as shown in FIG. 3A. In some examples, the reduced bend radius allows for placement of the cables under a heatsink or other components (not shown) associated with the ASIC/PCB.

Figure 2A:
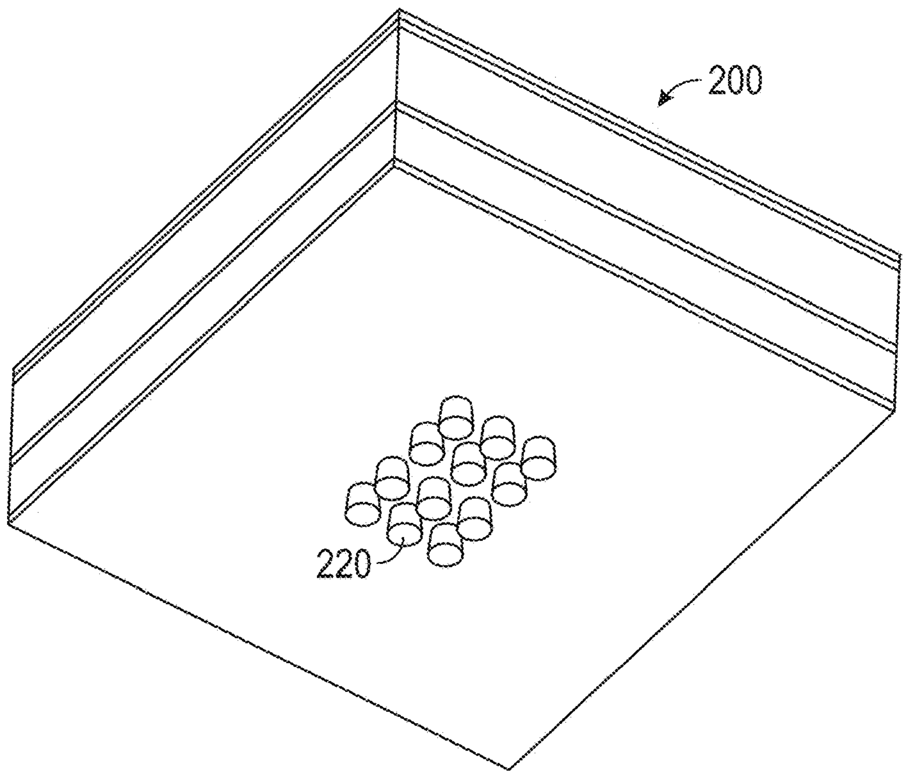
FIGS. 2A-2D illustrate a CPC tile, according to embodiments described herein.
Figure 2B:
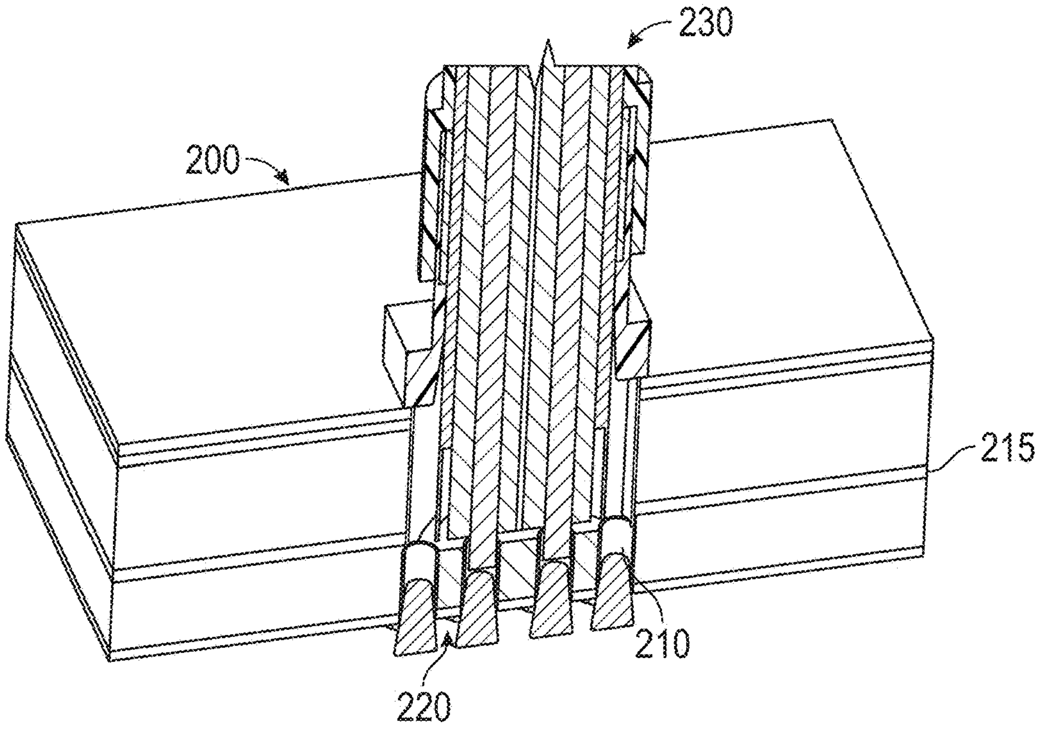

FIGS. 2A-2B illustrate a CPC tile 200, according to embodiments described herein. In some examples, the CPC tile 200 includes predrilled openings 210 to a ground plane layer 215 of the CPC tile 200. In some examples, elastomers 220 are preloaded into the predrilled opening 210 before cable 230 is connected to the CPC tile 200. Previous elastomer solutions required 20-25 grams per contact of force to mate between a connector and a pad on the PCB or PKG. The predrilled opening 210 and elastomers 220 significantly reduce the required force, (e.g., reduce the force by 50%) as the elastomers are preloaded into the drill opening during the connector/tile assembly.

Figure 2C:
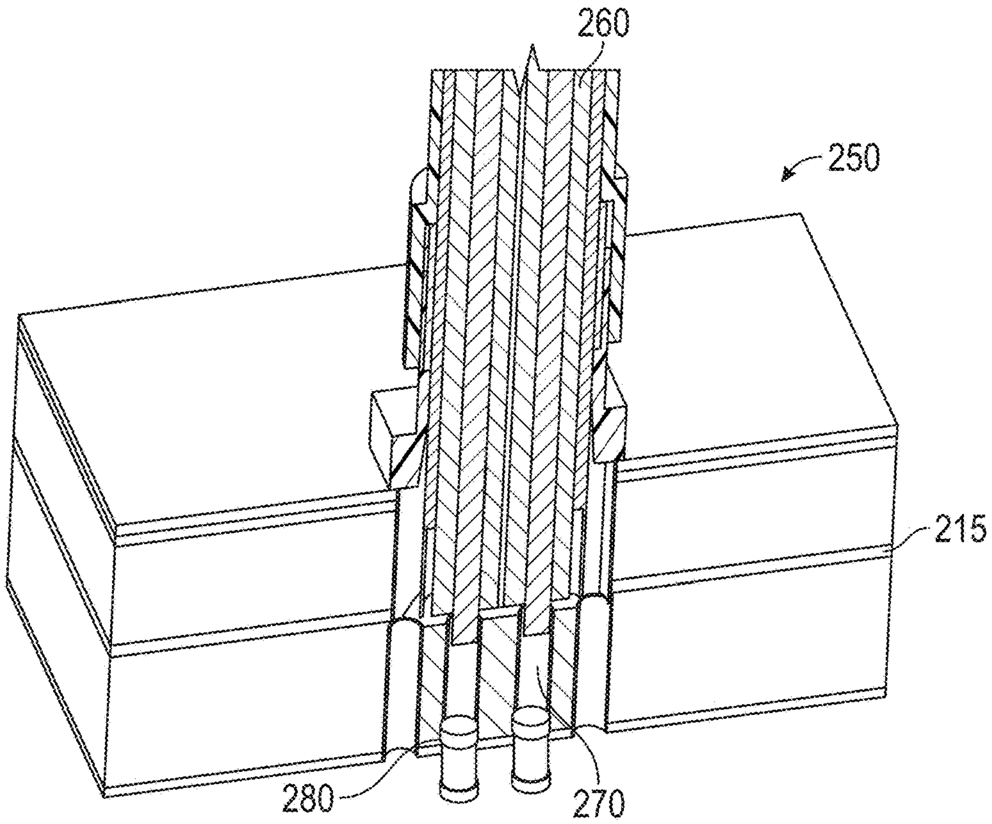
Figure 2D:
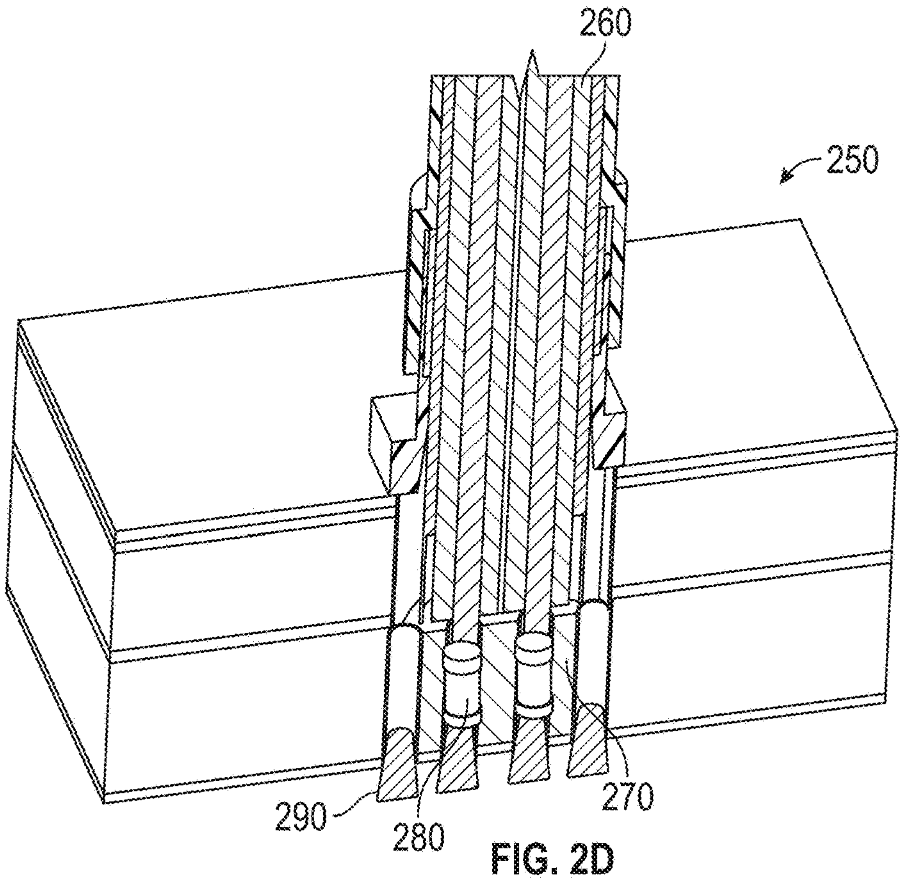

FIGS. 2C-2D illustrate a CPC tile 250 with cable 260, according to embodiments described herein. The CPC tile 250 includes predrilled openings 270 and inline alternating current capacitors AC capacitors 280 which are inserted into the opening 270 prior to forming elastomers 290 as shown in FIG. 2B. The AC capacitors 280 enable interoperability between different SerDes platforms and eliminate any base line wander caused by capacitors in the SerDes platforms to which the CPC tile 250 is connected.

Figure 3B:
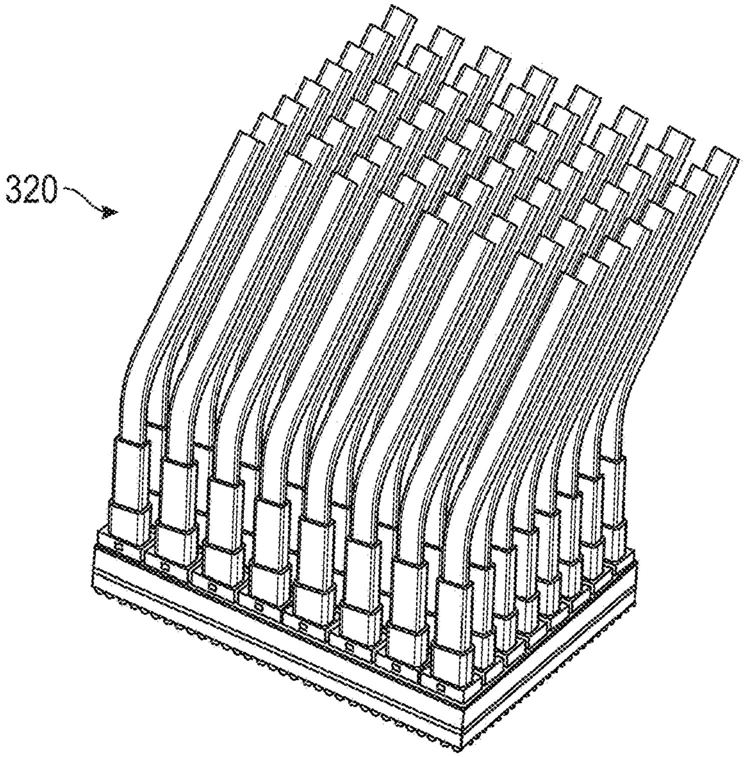
Figure 3C:
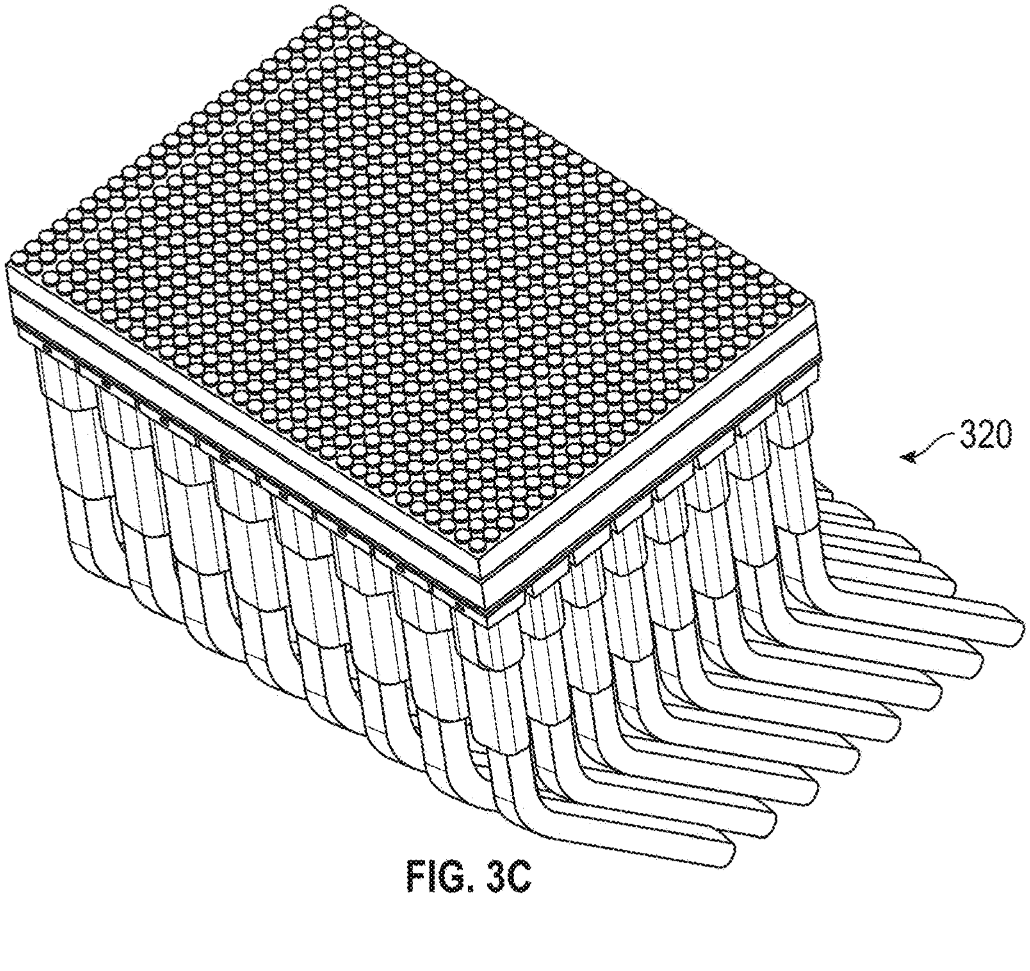

FIG. 3A-3B illustrates an ASIC with a plurality of CPCs, according to embodiments described herein. The ASIC 300 is on a PCB 305 which also includes CPCs 310. The CPCs 310 include a CPC 320. The CPC 320 is shown in a top perspective in FIG. 3B and a bottom perspective in FIG. 3C. The CPCs 310 on the PCB 305 provide a Pin-less coaxial like structure terminating twinax cables into a PCB tile used for CPC and NPC applications as also shown in FIGS. 2A-2D. In some examples, the fully isolated fine pitch twin-axial PCB structure enables high density and superior Xtalk isolation among the cables and the connections in the cables. In some examples, the PCB 3055 and the CPCs 310 are fabricated using PCB processes as described in relation to FIGS. 5A-10.

In some examples the cables in the CPCs 310 are able to be easily reworked along with the associated elastomer pins. The ASIC 300 and PCB 305 along with the CPCs 310 may also provide multiple termination options on either interposer, PKG, PCB, or pad, using either elastomer or land grid array (LGA) pins and Solderball contacts.

In some examples, the application of elastomer reduces a force required to make the connection to that interposer, package or PCB using the pre-loaded elastomer pins discussed in FIGS. 2A-2D. In some examples, the CPCs 310, including all or a subset, may also include V shaped slots shown in in FIG. 1B to enable lower profile and better cable management.

Figure 4A:
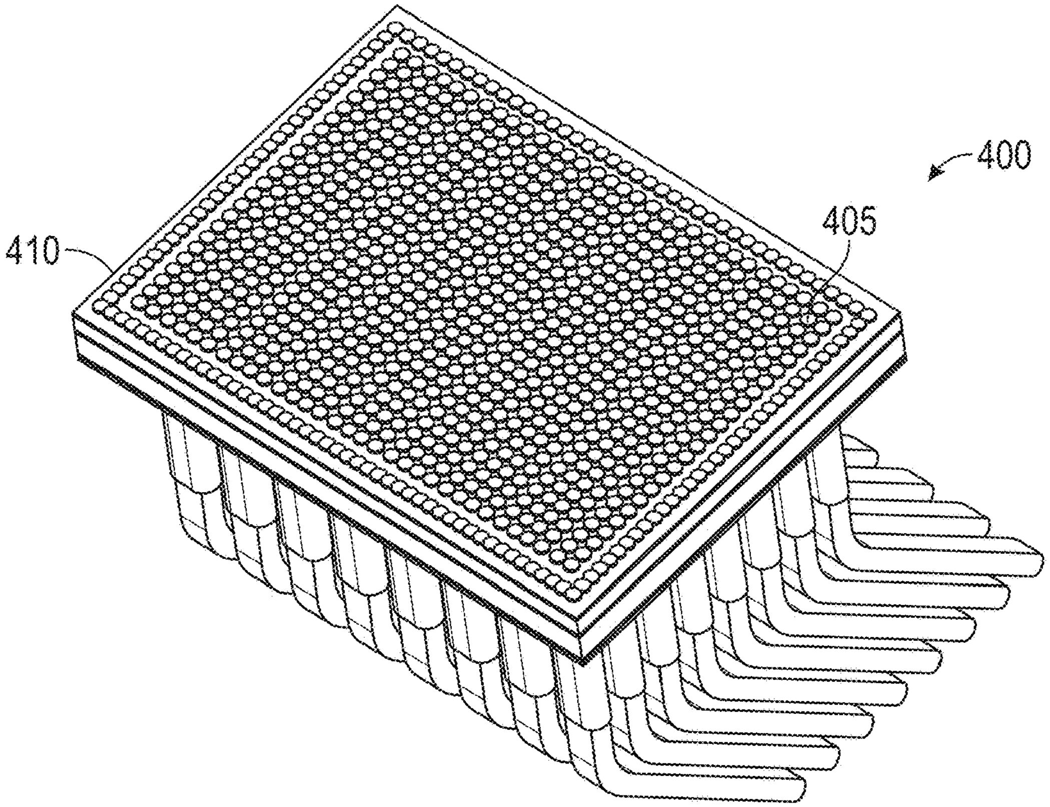
FIGS. 4A-4C illustrate a CPC tile, according to embodiments described herein.
Figure 4B:
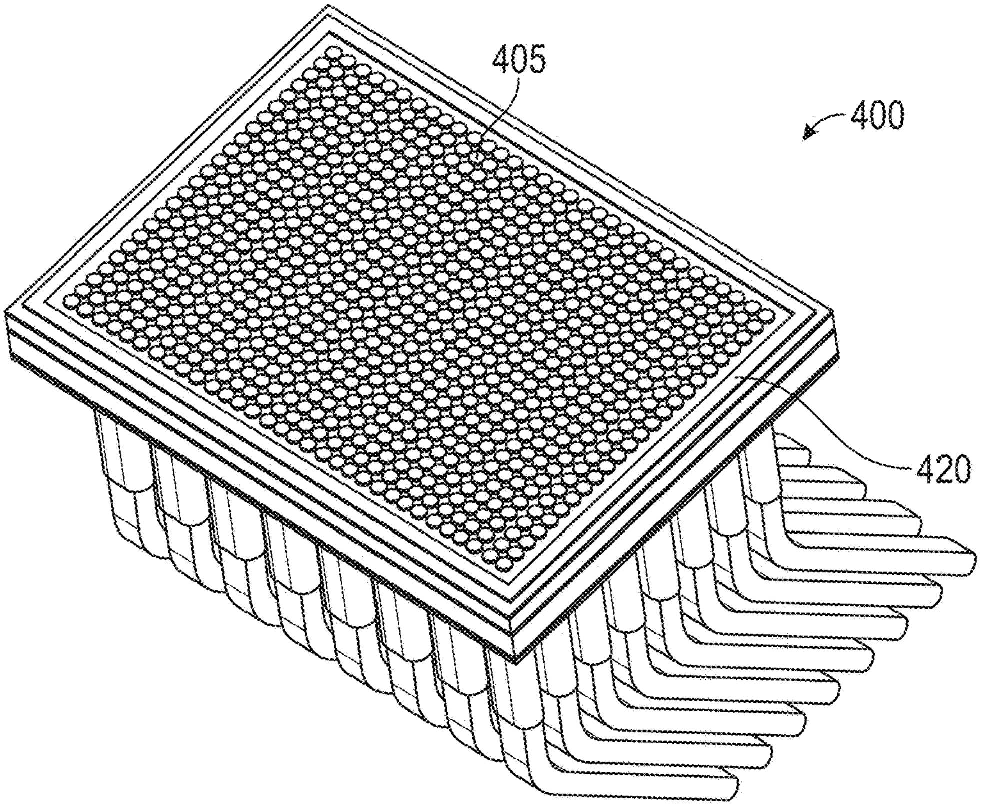
Figure 4C:
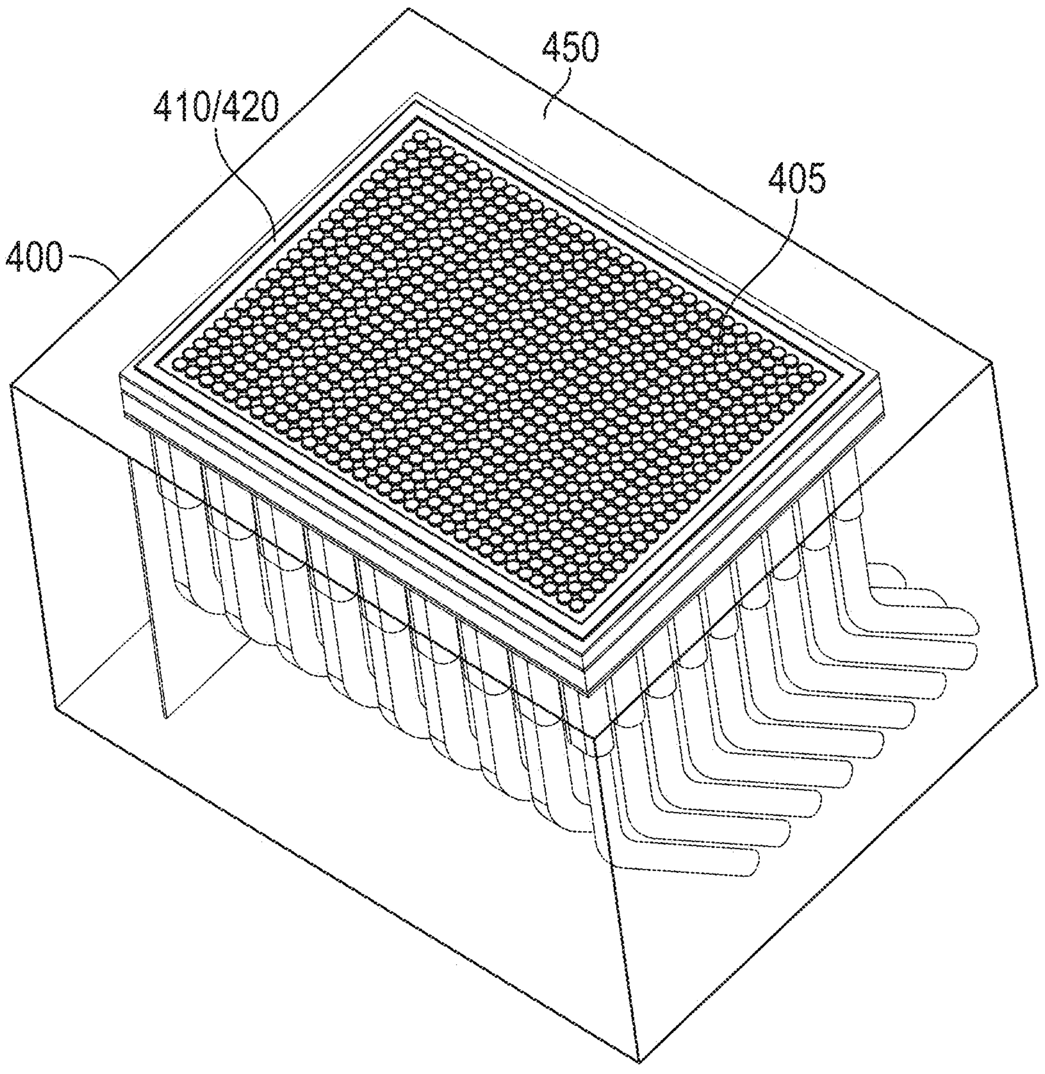

FIGS. 4A-4C illustrate a CPC tile 400, according to embodiments described herein. Immersion Cooling used in some of data center configurations can cause a negative impact on connections between a PCB/ASIC and connected cables due to the dielectric constant (DK) of the fluid material used for cooling. The CPC tile 400 includes an elastomer barrier, such as barrier 410 in FIG. 4A and barrier 420 in FIG. 4B.

The barrier 410 includes elastomer dots formed around an outer perimeter of the CPC tile 400, where the barrier 410 provides a seal against a cooling liquid 450 shown in FIG. 4C when the elastomer dots are compressed. In some examples, the elastomer dots are not electrically connected to anything and are placed closely together (e.g., closer than in the ground and signals pins array 405) such that the elastomer dots in the barrier 410 touch each other and provide a seal when compressed (e.g., as shown in FIG. 4C). In another example, the barrier 420 includes a continuous elastomer formed around the perimeter as a solid structure, where the continuous elastomer (e.g., not dots) provides a seal against the cooling liquid 450 shown in FIG. 4C. In both examples, the cooling liquid 450 is prevented from entering the ground and signals pins array 405 by the barrier 410 and the barrier 420.

FIGS. 5A-5H illustrate a top view of a CPC tile during a fabrication process according to embodiments described herein. The fabrication process begins in FIG. 5A, where a fabricator forms a PCB 510 and a ground plane 505. In FIG.

Figure 5A:
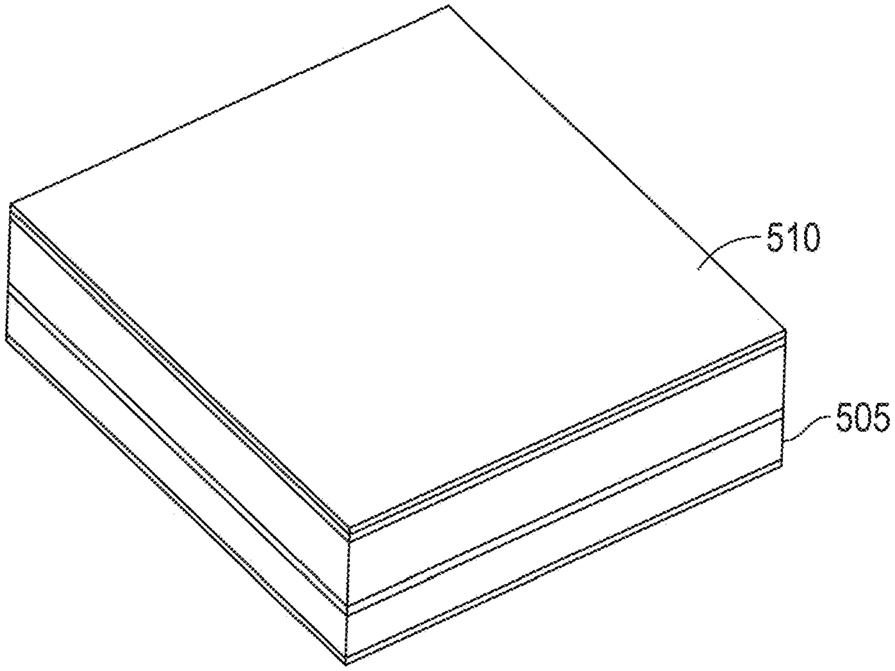
FIGS. 5A-5H illustrate an isometric view of a CPC tile during a fabrication process according to embodiments described herein.
Figure 5B:
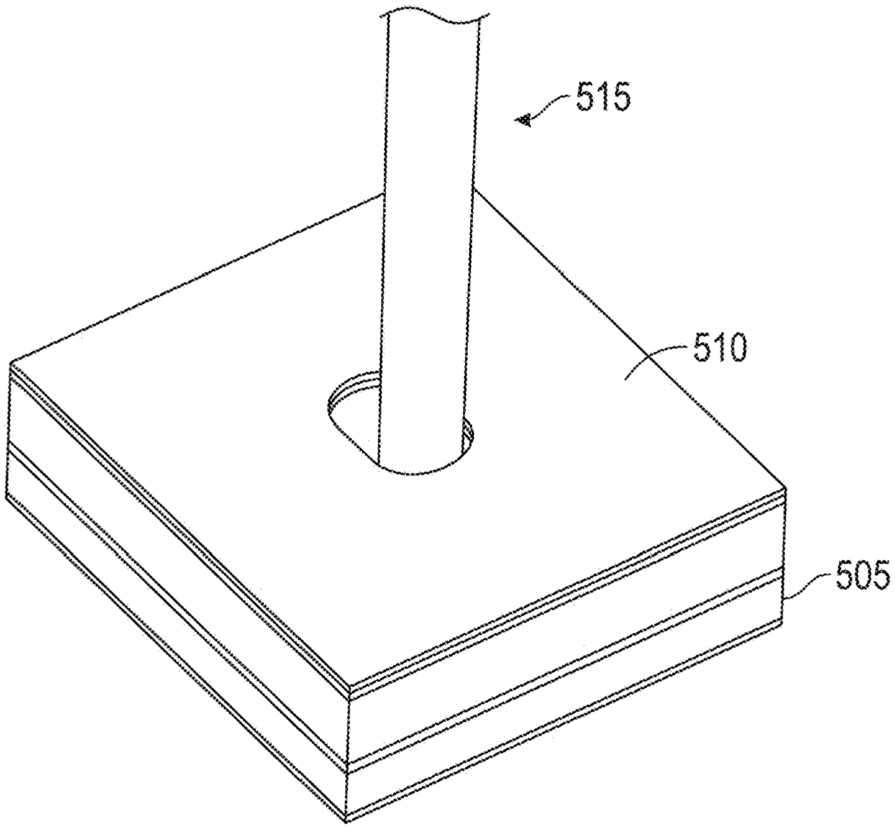
Figure 5C:
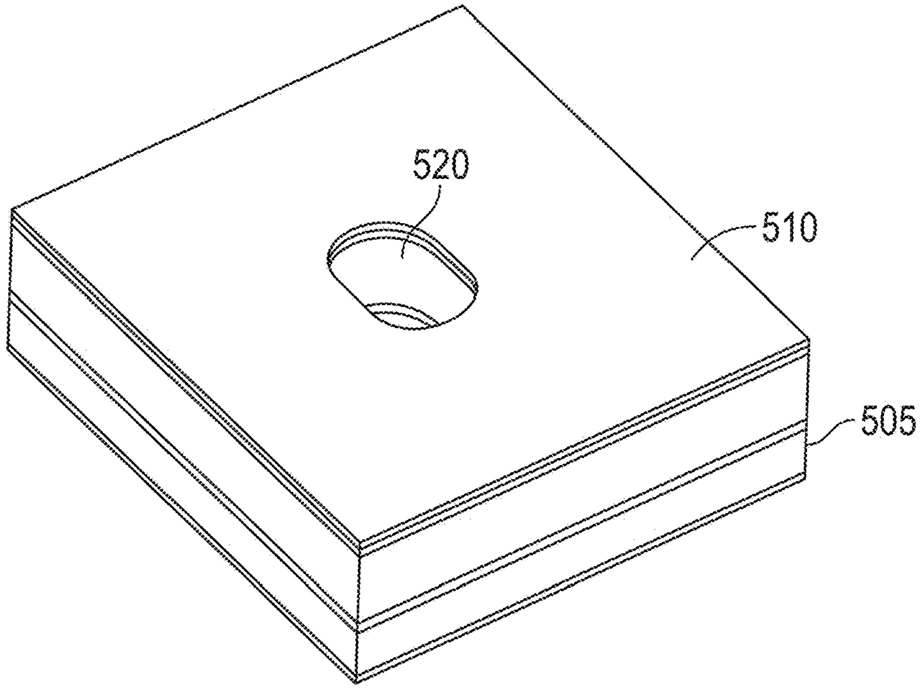
Figure 5D:
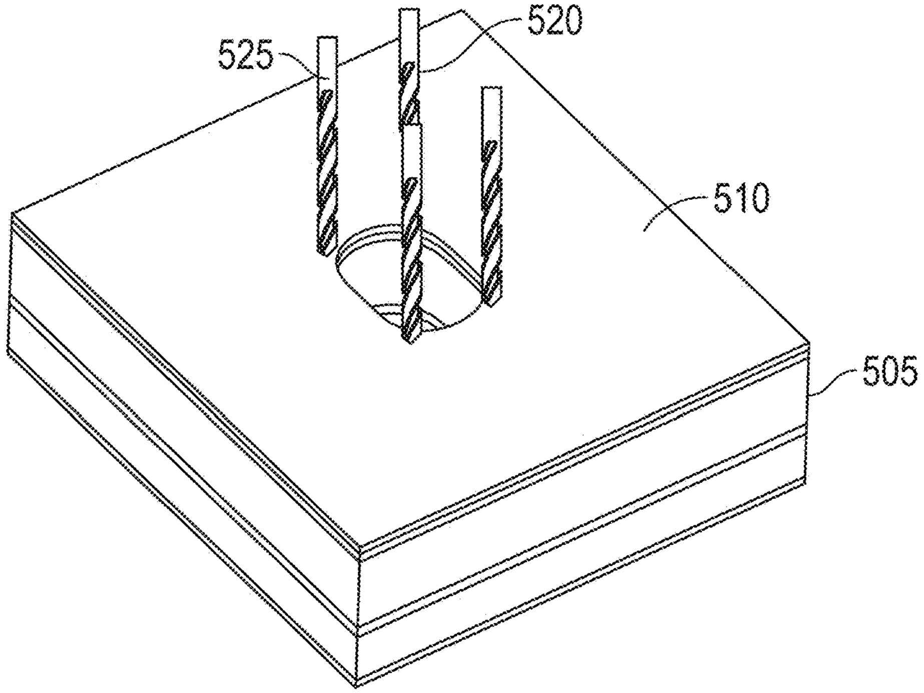
Figure 5E:
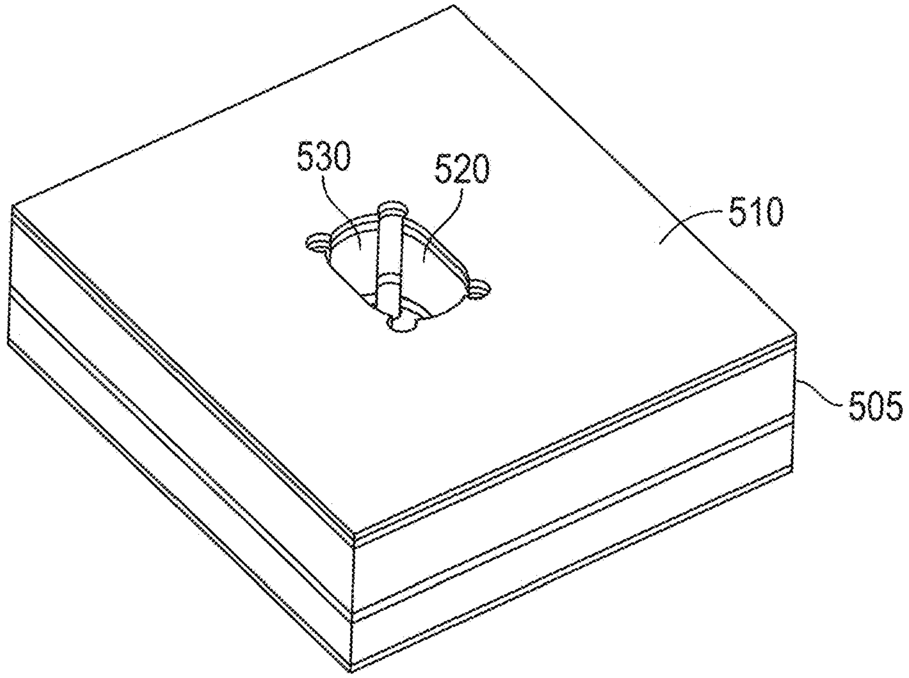
Figure 5F:
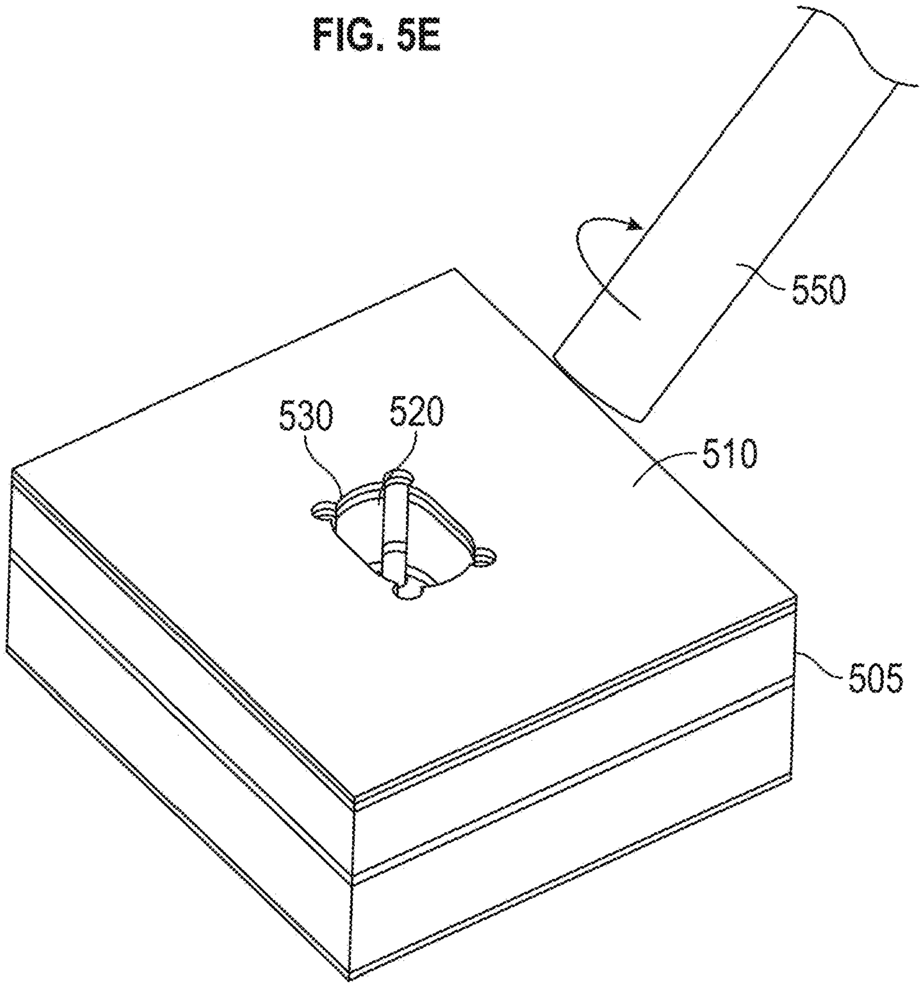
Figure 5G:
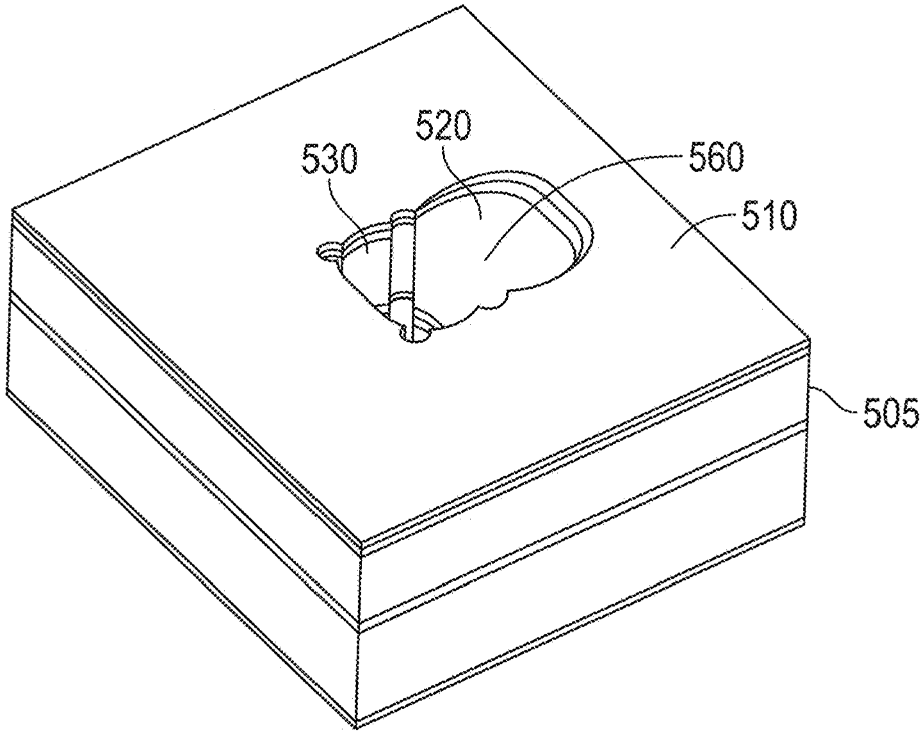
Figure 5H:
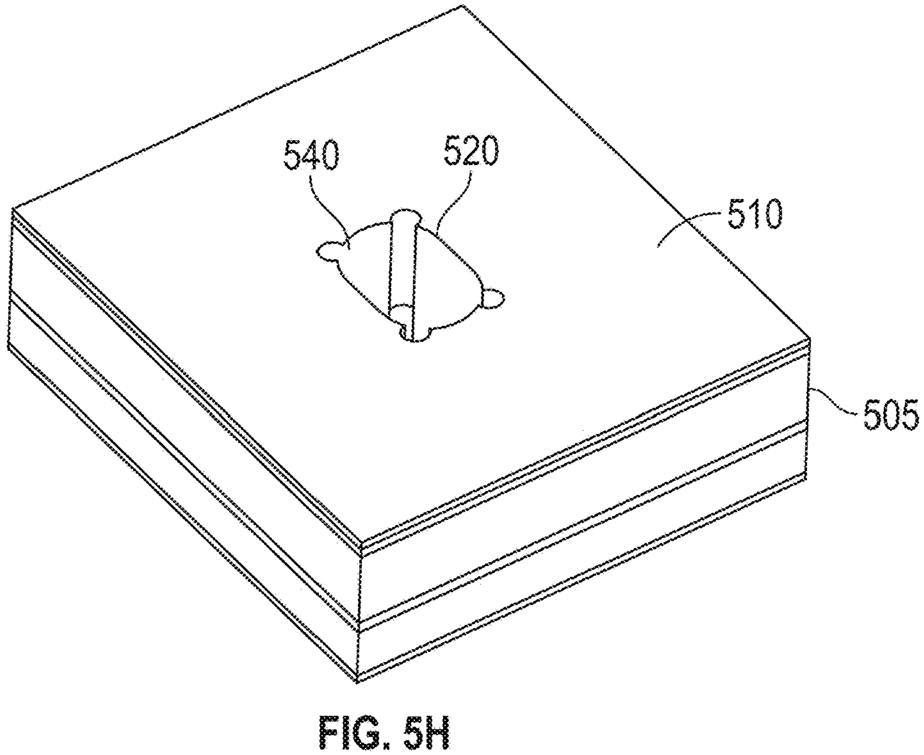

5B, the fabricator uses a drill 515 (e.g., a slot drill) to form an opening 520 in the PCB 510 shown in FIG. 5C. In FIG. 5D, the fabricator using drill 525, drills holes 530 as mechanical structure supports, shown in FIG. 5E, in the PCB 510 through the ground plane 505 for a ground structure. In some examples, the fabricator, using drill 550 forms the v-shape 560 in the PCB 510 as shown in FIGS. 5F and 5G. In FIG. 5H, the fabricator forms plate 540 within the opening 520 and holes 530 and within the V-shape 560 (not shown in FIG. 5H).

Figure 6A:
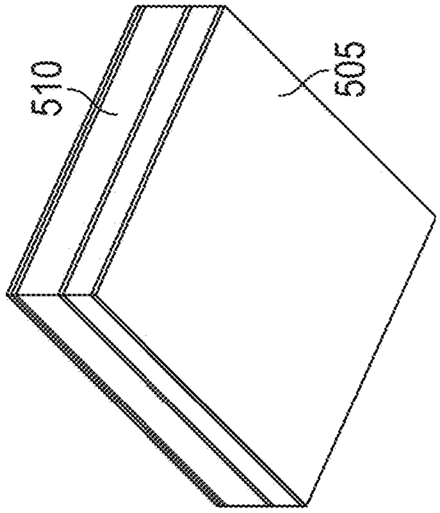
FIGS. 6A-6D illustrate a bottom view of a CPC tile during a fabrication process according to embodiments described herein.
Figure 6B:
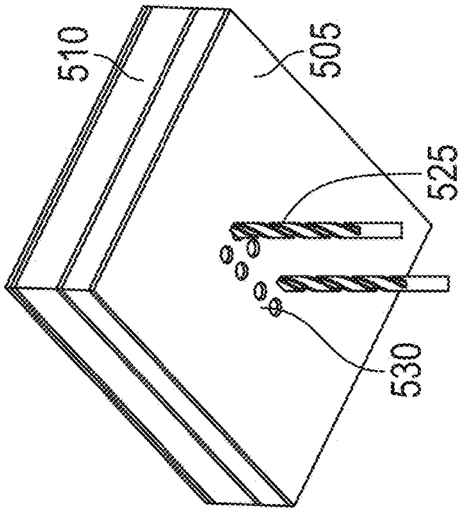
Figure 6C:
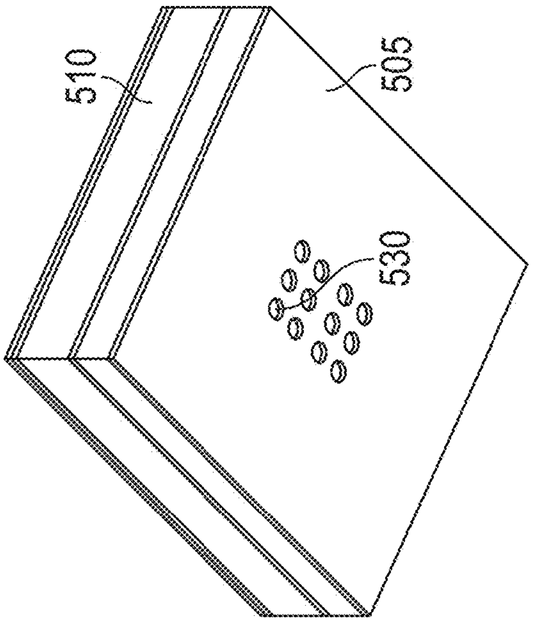
Figure 6D:
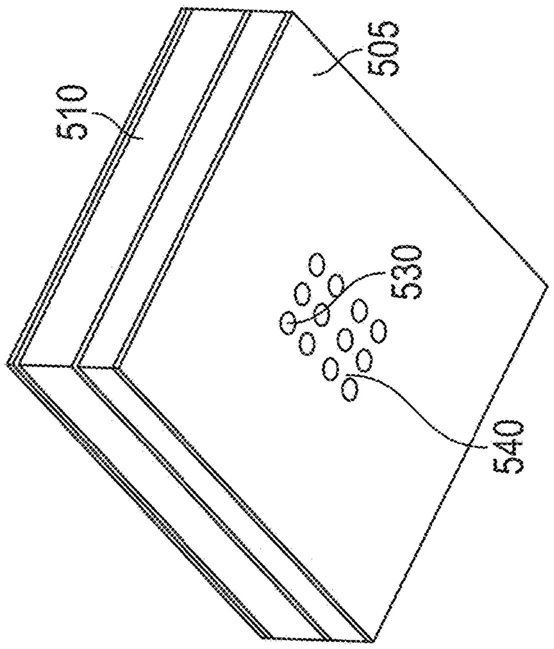

FIGS. 6A-6D illustrate a bottom view of a CPC tile during a fabrication process according to embodiments described herein. The fabrication process begins in FIG. 6A, where a fabricator forms the PCB 510 and the ground plane 505 as also shown in FIG. 5A. In FIG. 6B, the fabricator, using drill 525, drills holes 530, shown in FIG. 6C, in the PCB 510 through the ground plane 505 for a ground structure. In FIG. 6D, the fabricator forms plate 540 within the opening 520 and holes 530.

Figure 7A:
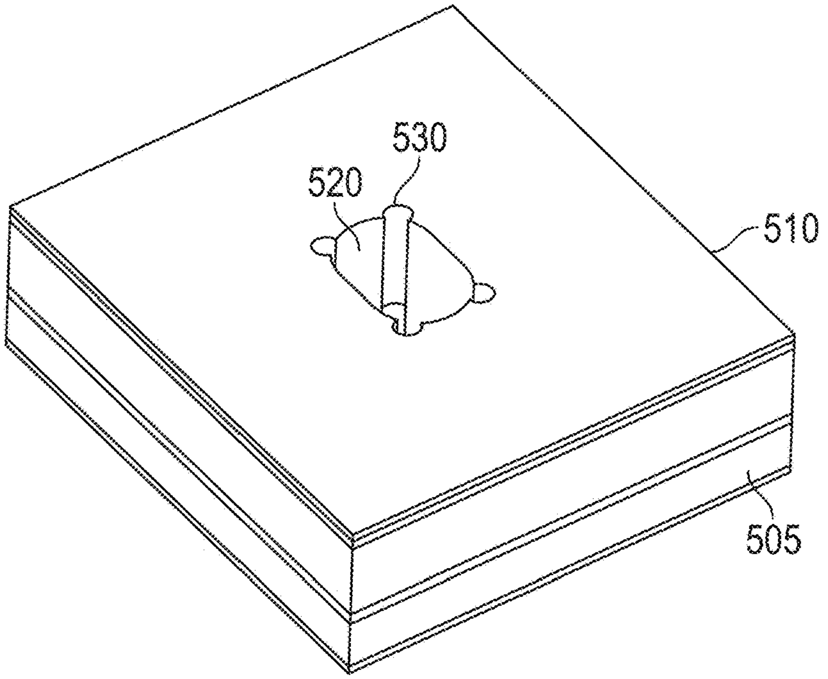
FIGS. 7A-7G illustrate an isometric view of a CPC tile during a fabrication process, according to embodiments described herein.
Figure 7B:
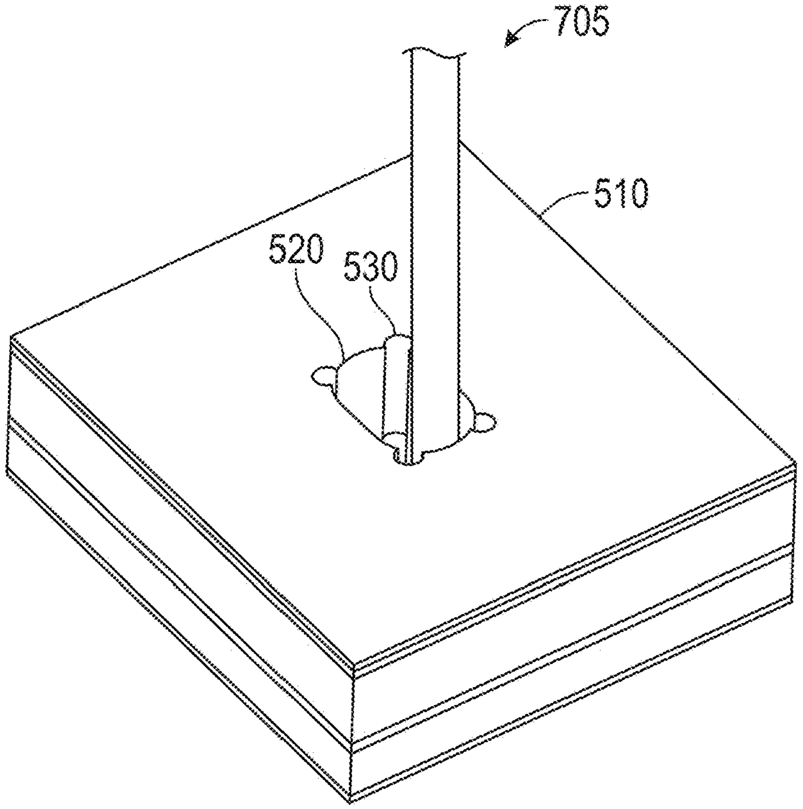
Figure 7C:
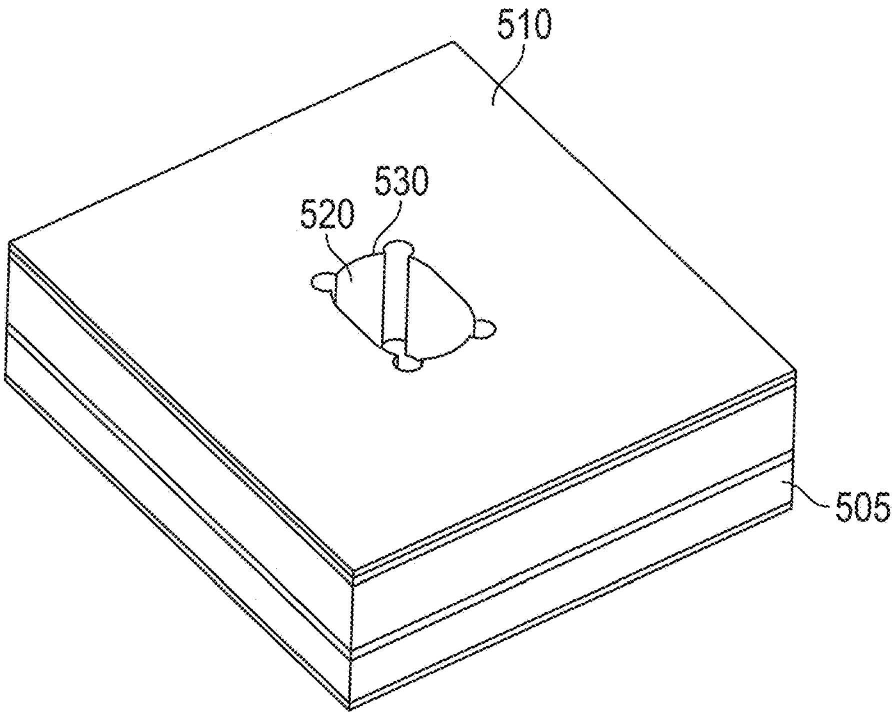
Figure 7D:
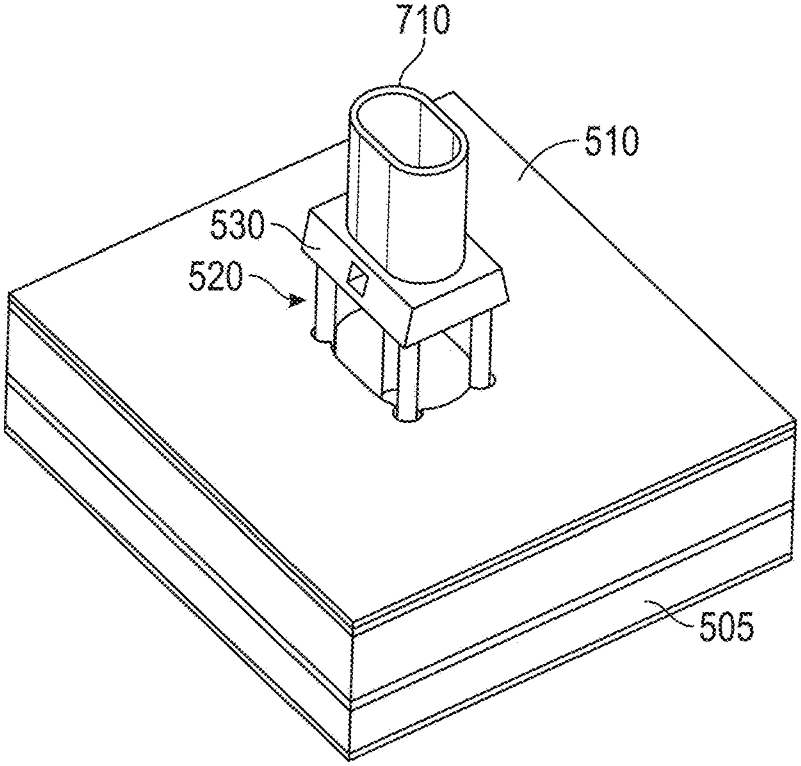
Figure 7E:
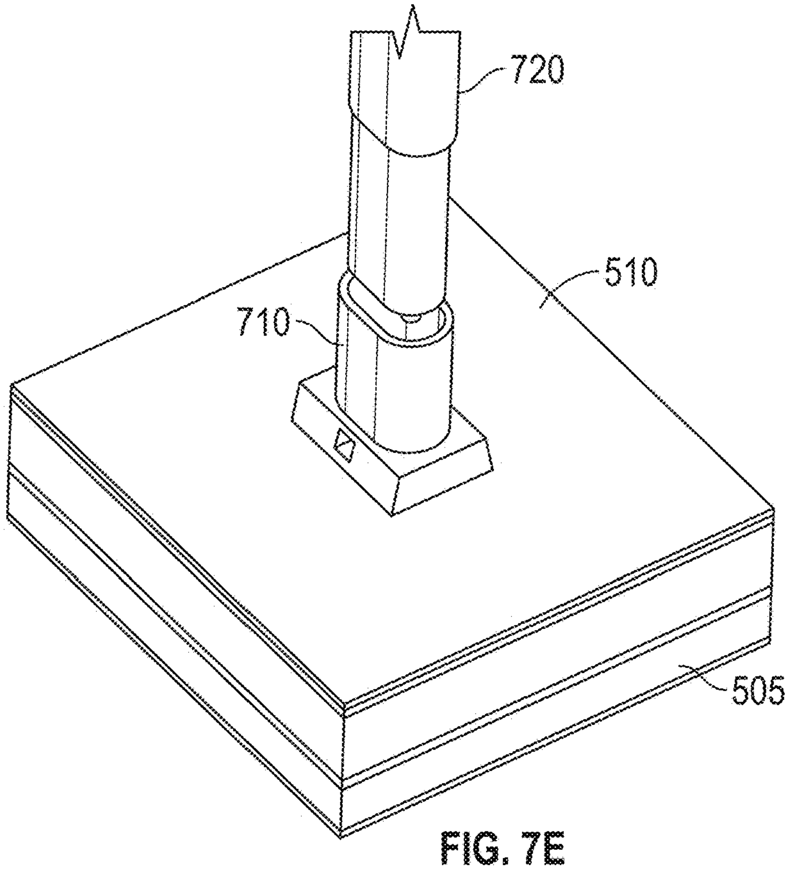
Figure 7F:
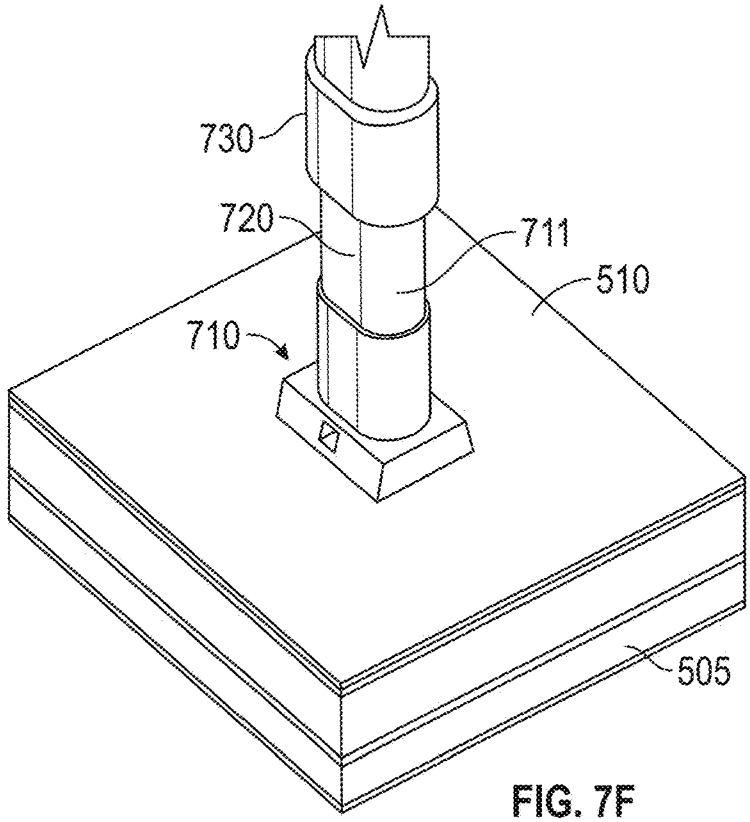
Figure 8A:
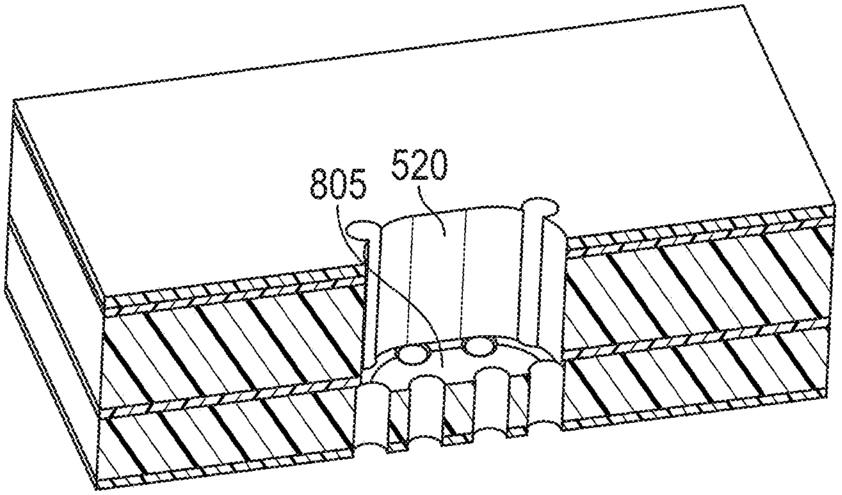
FIGS. 8A-D illustrate an cross-section view of a CPC tile during a fabrication process, according to embodiments described herein
Figure 8B:
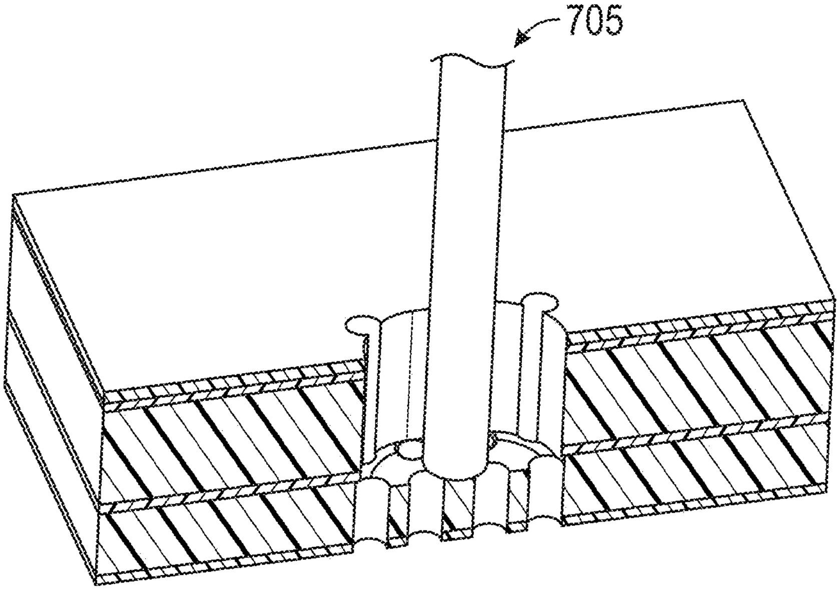
Figure 8C:
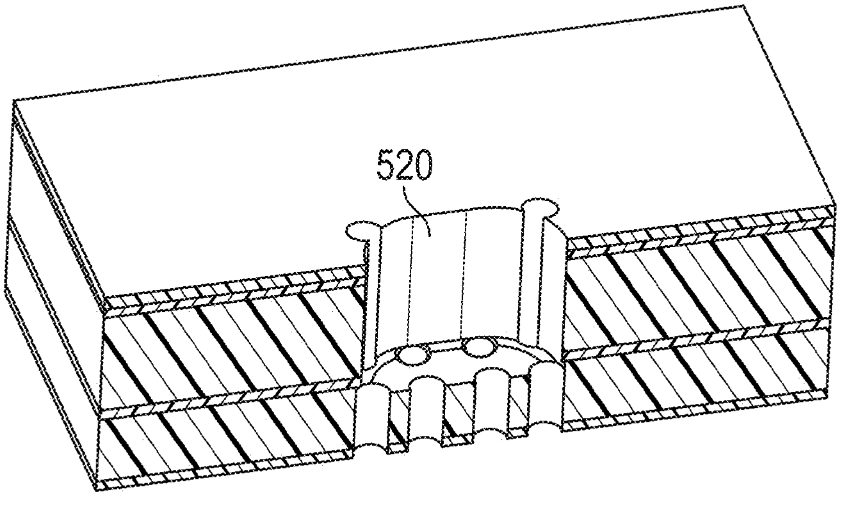

FIGS. 7A-7F illustrate a top view of a CPC tile during a fabrication process and FIGS. 8A-D illustrate a cross-section view of a CPC tiles during a fabrication process according to embodiments described herein. The fabrication process described in FIGS. 5A-6D continues in FIGS. 7A and 8A. In some examples, a short 805 may occur between connection points in the opening 520 as shown in FIG. 8A. In FIGS. 7B and 8B, the fabricator uses a router/drill bit 705 to remove the short 805 as shown in FIGS. 7C and 8C.

In FIG. 7D the fabricator affixes a ground shield structure 710 into holes 530 in the PCB 510 above the opening 520. In FIG. 7E, the fabricator inserts a cable 720 into the ground structure 710. In some examples, the cable 720 is a twinax cable.

Figure 7G:
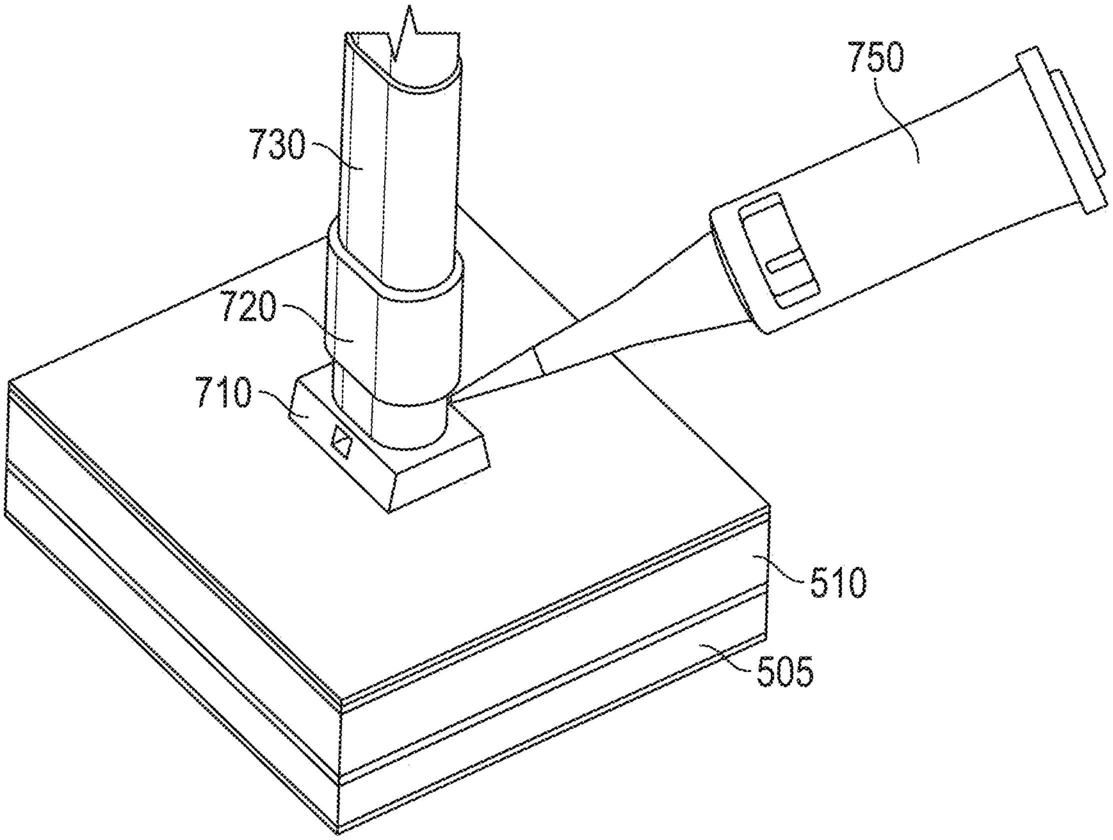
Figure 8D:
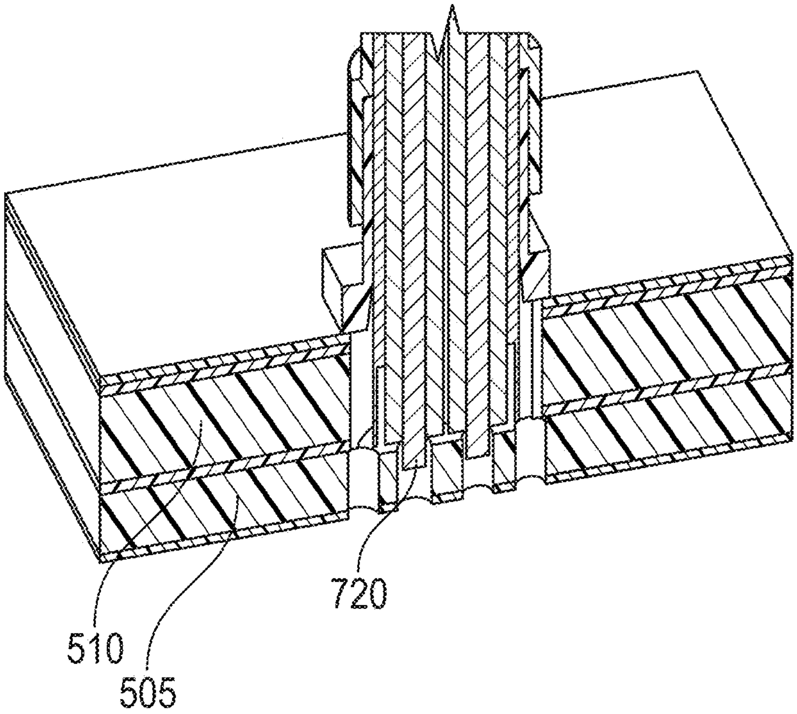

In some examples, the fabricator places a strain reliever sleeve 730 of a strain relief structure over the cable 720 as shown in FIGS. 7F and 8D in order to cover joint 711 between the twinaxial cable and the ground shield. In some examples, the cable 720 is connected in the opening 520 as shown in FIG. 8D. The fabricator also uses a solder paste injector 750 to apply solder to the ground structure 710 (which includes an overfill hole for extra solder) and heat/bakes the tile as shown in FIG. 7G.

Figure 9A:
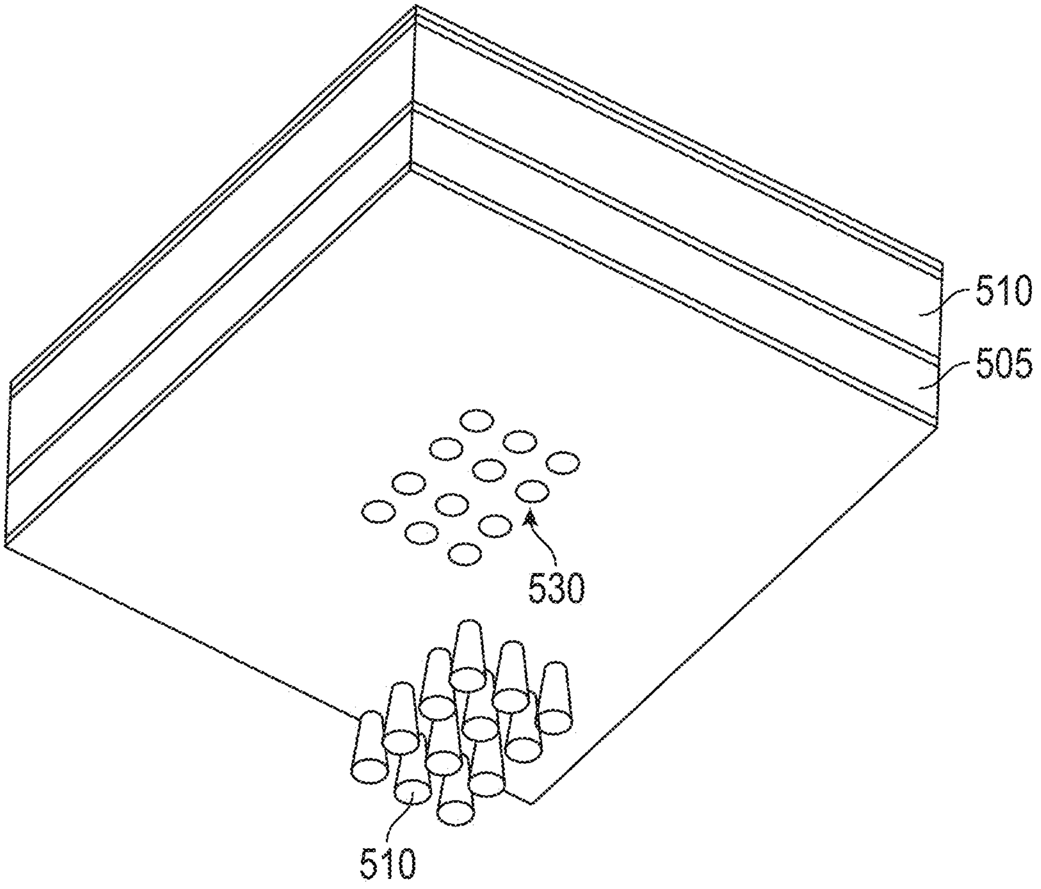
FIGS. 9A-9B illustrate a reverse isometric view of a CPC tile during a fabrication process, according to embodiments described herein.
Figure 9B:
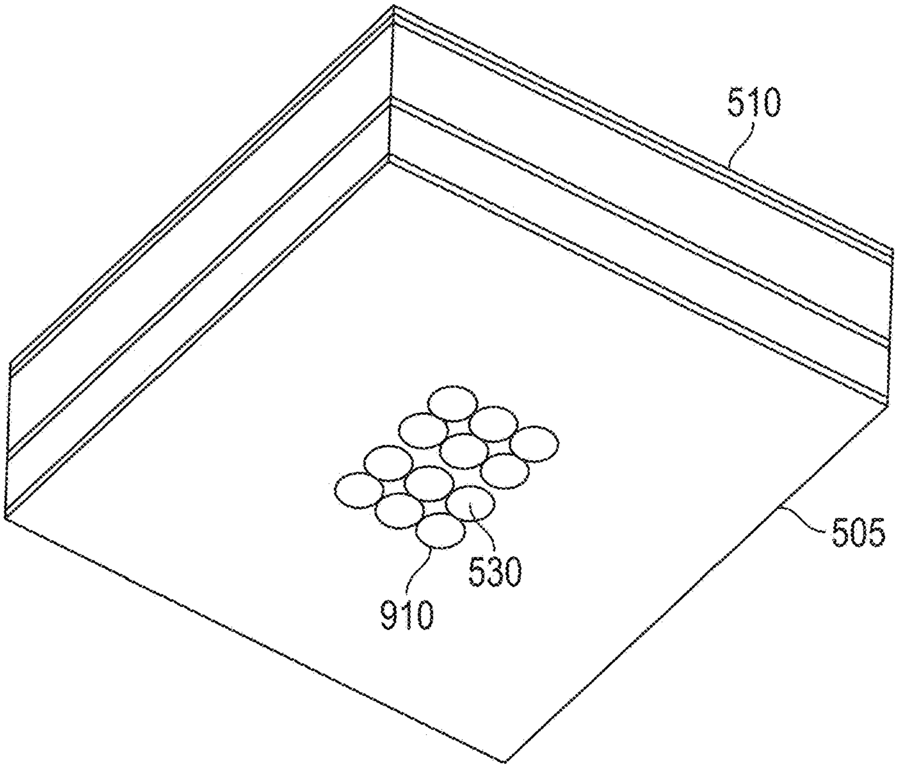
Figure 10:
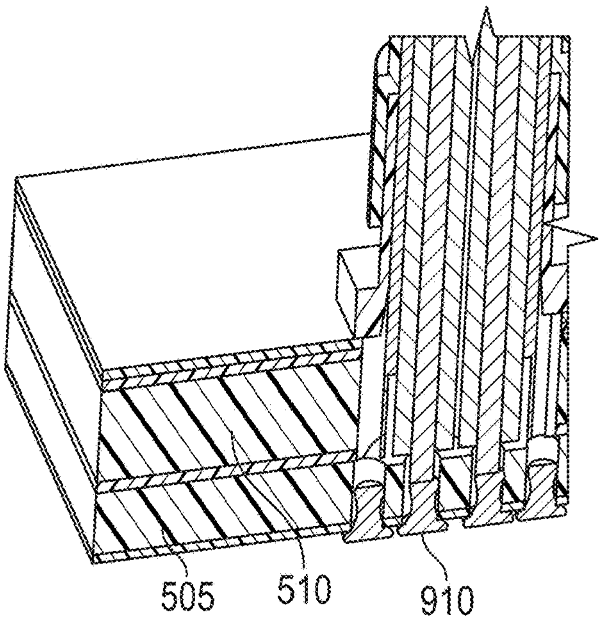
FIG. 10 illustrates a cross-section view of a CPC tiles during a fabrication process, according to embodiments described herein.

FIGS. 9A-9B illustrate a bottom view of a CPC tile during a fabrication process and FIG. 10A illustrates a cross-section view of a CPC tiles during a fabrication process according to embodiments described herein. In some examples, a fabricator forms elastomers 910 in the holes 530 as shown in FIG. 9A and compresses the elastomers 910 as shown in FIGS. 9B and 10.

Figure 11:
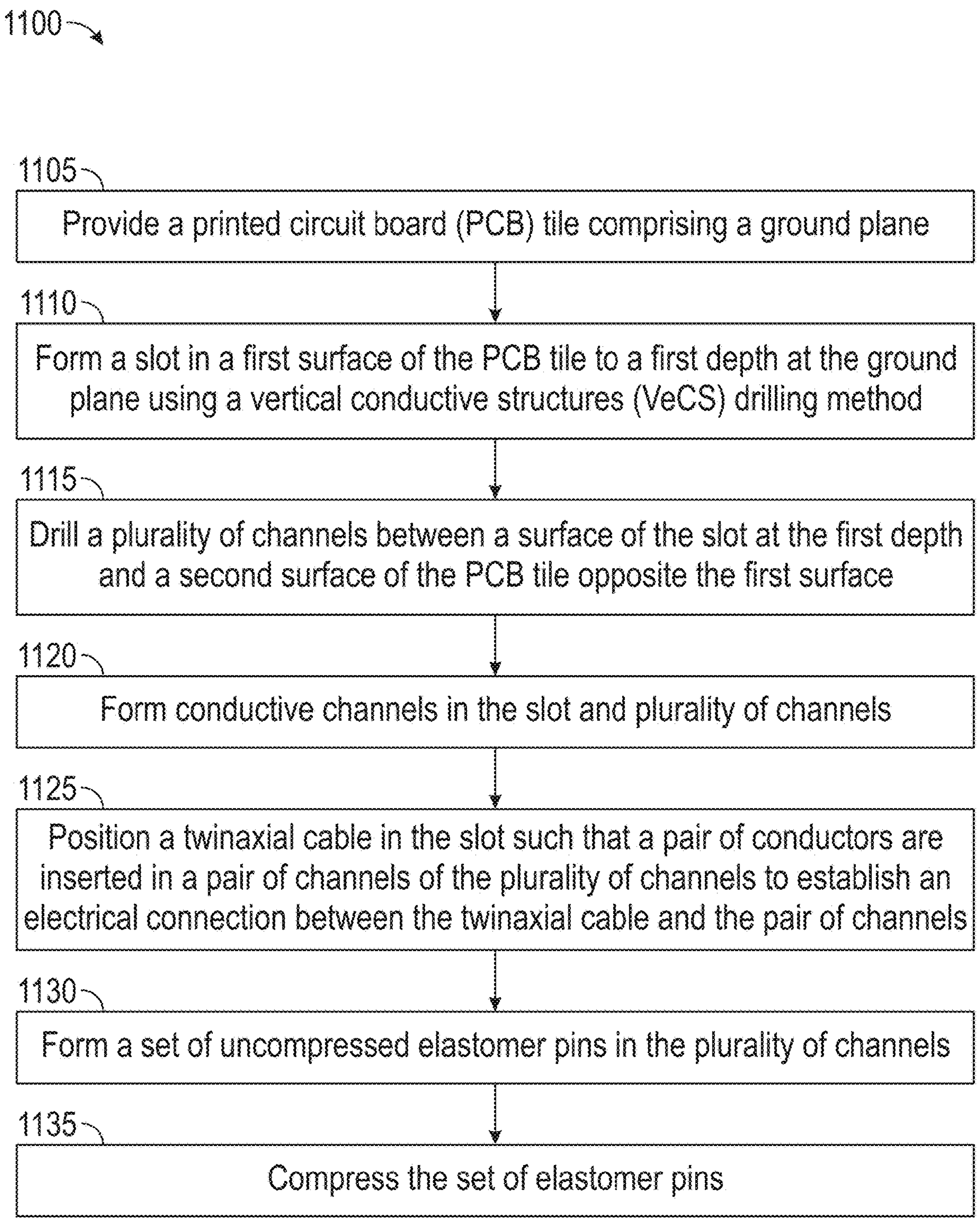
FIG. 11 a method of fabrication for a CPC tile, according to embodiments described herein.

FIG. 11 a method of fabrication for a CPC tile, according to embodiments described herein. Method 1100 begins at block 1105 where a fabricator provides a printed circuit board (PCB) tile that includes a ground plane. At block 1110, the fabricator forms a slot in a first surface of the PCB tile to a first depth at the ground plane using a slot drilling method. At block 1115, the fabricator drills a plurality of channels between a surface of the slot at the first depth and a second surface of the PCB tile opposite the first surface. At block 1120, the fabricator forms conductive channels in the slot and plurality of channels. At block 1125, the fabricator positions a twinaxial cable in the slot such that a pair of conductors are inserted in a pair of channels of the plurality of channels to establish an electrical connection between the twinaxial cable and the pair of channels. At block 1130, the fabricator forms a set of uncompressed elastomer pins in the plurality of channels. At block 1135, the fabricator compresses the set of elastomer pins.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A communication interconnect system comprising:
- a co-packaged cables (CPC) tile comprising:
  - a slot formed from a first surface to slot surface at a first depth in the CPC tile;
  - a plurality of channels formed between the slot surface and a second surface opposite the first surface;
- a twinaxial cable comprising a pair of conductors and positioned in the slot such that the pair of conductors are inserted in a pair of channels of the plurality of channels to establish an electrical connection between the twinaxial cable and the pair of channels;
- a plurality of elastomer pins positioned in the plurality of channels adjacent to the second surface; and
- at least two inline Alternating Current capacitors positioned in the pair of channels between pair of conductors and a respective elastomer pin of the plurality of elastomer pins.

2. The communication interconnect system of claim 1, wherein the plurality of elastomer pins comprise a preloaded elastomer pins formed in the plurality of channels.

3. The communication interconnect system of claim 1, wherein the slot is formed via a slot drilling method.

4. The communication interconnect system of claim 1, wherein the slot surface comprises a sloped surface, wherein the twinaxial cable is positioned along the sloped surface at an angle less than 90 degrees relative to the first surface.

5. The communication interconnect system of claim 1, further comprising:
- a strain relief structure configured to relieve strain on the twinaxial cable inserted into the slot, the strain relief structure comprising:
- a ground shield positioned on the first surface above the slot; and
- a sleeve covering a joint between the twinaxial cable and the ground shield.

6. The communication interconnect system of claim 1, further comprising:
- an array of slot and twinaxial cable combinations on the CPC tile;
- an outer perimeter defined on the second surface and around the array of slot and cable combinations; and
- a plurality of elastomer pins positioned along the outer perimeter at a pitch to provide a liquid seal.

7. The communication interconnect system of claim 6, wherein the plurality of elastomer pins form a solid structure along the outer perimeter.

8. The communication interconnect system of claim 1, wherein the slot surface is formed along a ground plane layer in the CPC tile.

9. A communication interconnect system comprising:
- a co-packaged cables (CPC) tile comprising:
  - an array of slots formed from a first surface a first depth in the CPC tile;
  - a array of a plurality of channels formed between a slot surface in each respective slot of the array of slots and a second surface opposite the first surface;
- a plurality of twinaxial cable each comprising a pair of conductors and positioned in respective slot of the array of slots such that the pair of conductors are inserted in a pair of channels of the plurality of channels to establish an electrical connection between the twinaxial cable and the pair of channels;
- a first plurality of elastomer pins positioned in the plurality of channels adjacent to the second surface;
- an outer perimeter defined on the second surface and around the array of slots; and
- a second plurality of elastomer pins positioned along the outer perimeter at a pitch to provide liquid insulation.

10. The communication interconnect system of claim 9, wherein the plurality of elastomer pins comprise a preloaded elastomer pins formed in the plurality of channels.

11. The communication interconnect system of claim 9, wherein the array of slots comprise vertical slots formed using a slot drilled method.

12. The communication interconnect system of claim 9, wherein the plurality of elastomer pins form a solid structure along the outer perimeter.

13. A communication interconnect system comprising:
- a co-packaged cables (CPC) tile comprising:
  - a slot formed from a first surface to slot surface at a first depth in the CPC tile, wherein the slot surface is formed along a ground plane layer in the CPC tile;
  - a plurality of channels formed between the slot surface and a second surface opposite the first surface;

a twinaxial cable comprising a pair of conductors and positioned in the slot such that the pair of conductors are inserted in a pair of channels of the plurality of channels to establish an electrical connection between the twinaxial cable and the pair of channels; and a plurality of elastomer pins positioned in the plurality of channels adjacent to the second surface.

* * * * *